United States Patent [19]
Nakajima

[11] Patent Number: 6,040,763
[45] Date of Patent: Mar. 21, 2000

[54] VEHICLE THEFT PREVENTION DEVICE WITH A LOW POWERED RECEIVER

[75] Inventor: Yoshiyuki Nakajima, Saitama, Japan

[73] Assignee: Honda Giken Kogyo Kabushiki Kaisha, Tokyo, Japan

[21] Appl. No.: 08/896,067

[22] Filed: Jul. 17, 1997

[30] Foreign Application Priority Data

Jul. 17, 1996 [JP] Japan .................................. 8-187910

[51] Int. Cl.⁷ .................................................. B60R 25/10
[52] U.S. Cl. ........................ 340/427; 340/426; 340/425.5
[58] Field of Search ............................. 340/426, 425.5, 340/539, 527, 528, 333, 693, 825.69, 825.72, 427, 825.31, 825.32; 341/176; 455/574, 38.3, 343

[56] References Cited

U.S. PATENT DOCUMENTS

| | | | |
|---|---|---|---|
| 4,688,036 | 8/1987 | Hirano et al. | 340/825.69 |
| 4,733,215 | 3/1988 | Memmola | 340/426 |
| 4,973,958 | 11/1990 | Hirano et al. | 340/825.69 |
| 4,996,515 | 2/1991 | Schaffer et al. | 340/426 |
| 5,134,392 | 7/1992 | Takeuchi et al. | 340/825.69 |
| 5,172,094 | 12/1992 | Stadler | 340/527 |
| 5,247,564 | 9/1993 | Zicker | 340/527 |
| 5,258,741 | 11/1993 | Fuller | 340/426 |
| 5,334,969 | 8/1994 | Abe et al. | 340/426 |
| 5,453,763 | 9/1995 | De-Grinis et al. | 340/426 |
| 5,625,338 | 4/1997 | Pildner et al. | 340/539 |
| 5,638,050 | 6/1997 | Sacca et al. | 340/539 |
| 5,760,701 | 6/1998 | Mitsumoto | 340/825.69 |

FOREIGN PATENT DOCUMENTS

| | | |
|---|---|---|
| 0658672 | 6/1995 | European Pat. Off. . |
| 4329697 | 3/1995 | Germany . |
| 61-30451 | 2/1986 | Japan . |
| 4011178 | 4/1992 | Japan . |

*Primary Examiner*—Jeffery A. Hofsass
*Assistant Examiner*—Sihong Huang
*Attorney, Agent, or Firm*—Birch, Stewart, Kolasch & Birch, LLP

[57] ABSTRACT

An economical and highly reliable vehicle theft prevention device imposes a reduced load on a vehicle's battery. The theft prevention device includes a remote control having a transmitter. On the vehicle, there is provided a current controlling circuit which allows a receiver for the transmitter to operate for only a predetermined period of time. The receiver is allowed to operate for the predetermined period of time immediately after the ignition switch is opened, and immediately after a designated electrical accessory switch of the vehicle is closed.

20 Claims, 5 Drawing Sheets

VEHICLE THEFT PREVENTION DEVICE WITH A LOW POWERED RECEIVER

BACKGROUND OF THE INVENTION

1. Field of the Invention

The present invention relates to a vehicle theft prevention device having a reduced load imposed on the vehicle's battery.

2. Description of the Background Art

General vehicle mounted, theft prevention devices are known in the art. Such theft prevention devices may include a sensor for sensing a vibration of the vehicle, or a sensor for sensing movement of the vehicle using infrared rays or ultrasonic waves. Such theft prevention devices may also include a detection means for detecting disconnection of a particular circuit of the vehicle. When an attempt is made to steal the vehicle, one of the sensors or the detection means generates a signal. In response to the signal, an alarm is activated or the vehicle is disabled.

It is also known to equip a motorcycle with a theft prevention device. Such a motorcycle mounted, theft prevention device can be activated and deactivated by a remote control. In such a theft prevention device, a receiver is mounted to the motorcycle. The receiver must always be in a powered, waiting state in order to receive a signal from the remote control. Therefore, an operating current is always flowing into the receiver from the vehicle's battery. Over an extended period of time, this operating current amounts to a large load to the vehicle's battery.

Japanese Laid-Open No. Sho 61-30451 discloses a vehicle theft prevention device in which a first transmitter, a first receiver, and a security mechanism are mounted to a vehicle. A second transmitter and a second receiver are part of a portable unit. The second transmitter transmits a faint signal and the first receiver receives this faint signal. When the vehicle and the portable control are separated by more than a predetermined distance, the faint signal from the second transmitter can no longer be received by the first receiver. When this situation occurs, the security mechanism is activated to prevent theft of the vehicle.

In the JP Laid-Open Sho 61-30451 theft prevention device, the first transmitter and first receiver, mounted to the vehicle, are always in an operating state. Therefore, an operating current is continually flowing into the first transmitter and first receiver from the vehicle's battery. Again, over an extended period of time, this amounts to a large load being imposed on the vehicle's battery.

In summary, in the prior art theft prevention devices, which include a remote control, a receiver mounted to a vehicle must always be powered. The receiver is always powered so that it will be able, at any instant, to receive a deactivation signal from a transmitter in the remote control. The deactivation signal is used by the theft prevention device to deactivate the sensors and to allow the vehicle to be normally operated. The continually powered receiver is a constant draw on the vehicle's battery. This draw, over an extended period of activation of the theft prevention device, can lead to the vehicle's battery becoming dead or weak.

SUMMARY OF THE INVENTION

The present invention has been conceived to overcome the problems of the background art, namely reducing the load imposed on a vehicle's battery by a theft prevention device while activated.

The present invention has as a principal object to provide an economical and highly reliable vehicle theft prevention device which imposes a reduced load on a vehicle's battery. The theft prevention device includes a remote control having a transmitter. On the vehicle, there is provided a current controlling circuit which allows a receiver for the transmitter to operate for only a predetermined period of time. The receiver is allowed to operate for the predetermined period of time immediately after the ignition switch is opened, and immediately after a designated electrical accessory switch of the vehicle is closed.

A vehicle theft prevention device according to the invention includes an operating current controlling means for causing the receiver of a remote control to operate for only a predetermined period of time after a predetermined operation has been performed. During other times, no operating current will flow into the receiver. With this arrangement, it is possible to reduce a load imposed on the vehicle's battery.

The predetermined operation can be the operation of a predetermined one of the vehicle's electrical switches. After operation of the predetermined electrical switch, the receiver operates only for a predetermined period of time. By requiring the predetermined electrical switch to be first operated, it is possible to prevent theft of the vehicle by a person operating a fraudulent transmitter, since that person will not know which of the vehicle's electrical switches is the predetermined one.

The predetermined switch can be any of the electrical equipment switches of the vehicle besides the main switch (ignition switch). Since the device of the present invention uses an existing electrical switch, there is no need to provide an additional switch. Further, since various switches other than the main switch are not usually used for theft prevention, and a vehicle is provided with a variety of switches, it will be difficult for anyone other than the owner to deactivate the vehicle theft prevention device.

The present invention is particularly well-suited for use on a motorcycle. A motorcycle typically has a lower capacity battery, and the present invention is designed to operate with only a minimal load being imposed on the vehicle's battery.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
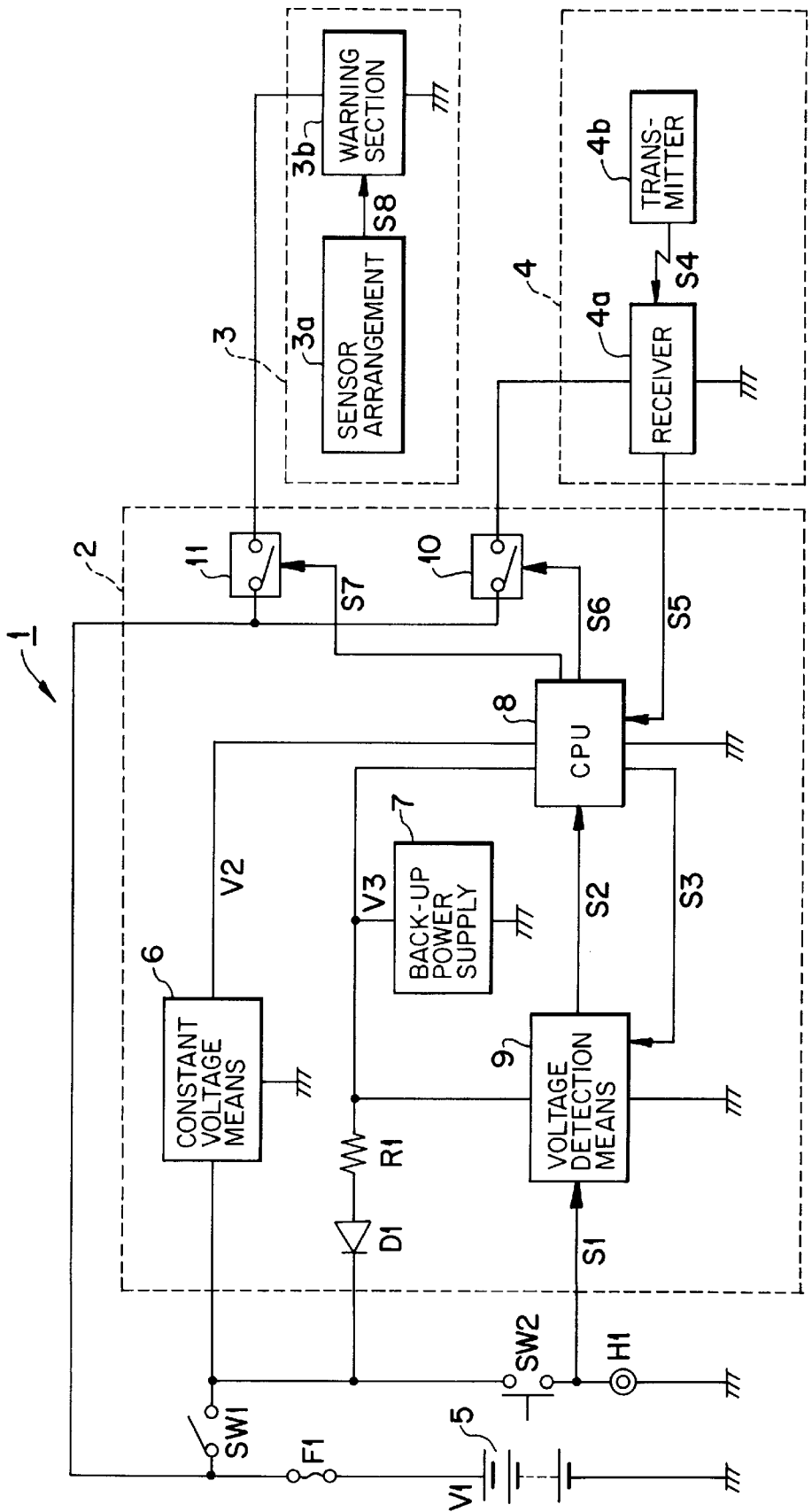
FIG. 1 is a block diagram showing elements of a vehicle theft prevention device of the present invention.

In FIG. 1, a vehicle theft prevention device 1 comprises an operating current controlling means 2, a warning means 3, a remote control means 4, a vehicle's battery 5, a fuse F1, a main switch SW1, a horn switch SW2, and a horn H1 of the vehicle.

The operating current controlling means 2 includes a constant voltage means 6, a back up power supply 7, a CPU (central processing unit) 8, a voltage detection means 9, a first switching means 10, a second switching means 11, a resistor R1, and a diode D1.

The remote control means 4 includes a receiver 4a and a transmitter 4b. The receiver 4a is mounted to the vehicle, and the transmitter 4b is carried by a driver. By operating the transmitter 4b, an operating signal S4 is transmitted to the receiver 4a. The operating signal S4 may be sent using radio waves, ultrasonic waves, infrared rays, or similar transmission methods.

The receiver 4a receives the operating signal S4 and outputs an operating signal S5 to the CPU 8 based on the characteristics of the operating signal S4.

The CPU 8 is a one-chip micro computer including a RAM, a ROM, and a timer. The CPU 8 can operate by interrupt control. Further, the CPU 8 is capable of performing input and output control to control various devices equipped on the vehicle. The CPU 8's operation is based in part on the second operating signal S5, transmitted from the receiver 4a.

The warning means 3 is mounted to the vehicle and includes a sensor arrangement 3a and a warning section 3b. The sensor arrangement 3a includes at least one sensor. The sensors of the sensor arrangement may be in the form of a sensor for detecting disconnection of lead wires connected to the main switch SW1, a vibration sensor for detecting a vibration of the vehicle, an ultrasonic sensor for detecting a movement of the vehicle using ultrasonic waves, an infrared sensor for detecting a movement of the vehicle using infrared rays, or other similar sensors.

The warning section 3b activates an audible alarm, such a siren, based on a sensor signal S8 outputted by one or more of the sensors of the sensor arrangement 3a. The sensor signal S8 occurs when for example, disconnection of a lead wire is detected, vibration of the vehicle is detected, or movement of the vehicle is detected. The warning section 3b may include means for prohibiting ignition of a spark plug. Therefore, when sensor signal S8 is received by the warning section 3b, the engine of the vehicle is disabled in order to prevent theft of the vehicle. The warning section 3b may include the means for prohibiting ignition of a spark plug, or the audible alarm, or both in combination.

Now, the general operation of the vehicle theft prevention device will be described. When the ignition switch, or main switch SW1, is closed, the operating current controlling means 2 causes the warning means 3 and the remote control 4 to not operate.

When the main switch SW1 is opened, the operating current controlling means 2 causes the receiver 4a to operate for a predetermined period of time. After the predetermined period of time, the operating current controlling means 2 turns off the operating power supplied to the receiver 4a. At this point, the receiver 4a draws no power from the vehicle's battery, and consequently the receiver 4a can no longer receive transmissions from the transmitter 4b of the remote control means 4. The predetermined period of time is preferably about 60 seconds.

In the operating current controlling means 2, the constant voltage means 6 generates a constant DC voltage V2. Voltage V2 is based on a DC voltage V1 supplied from the vehicle's battery via the fuse F1 and the main switch SW1. The constant voltage means 6 supplies the constant DC voltage V2 to the CPU 8.

The receiver 4a receives power from the vehicle's battery 5 via the first switching means 10. The warning section 3b receives power from the vehicle's battery 5 via the second switching means 11.

When the main switch SW1 is closed, the CPU 8 detects the constant DC voltage V2 via a power terminal. The CPU 8 then outputs a switch control signal S6 to open the first switching means 10, so that the receiver 4a is no longer supplied with DC voltage V1. Further, the CPU 8 outputs a switch control signal S7 to open the second switching means 11, so that the warning section 3b is no longer supplied with DC voltage V1.

In order to reduce a load imposed on the back up power supply 7, the CPU 8 outputs a control signal S3 to the voltage detection means 9. Signal S3 resets the voltage detection means 9, placing the voltage detection means 9 in a state where it is disconnected from the back up power supply 7 or in a state where it consumes a minimum amount of current.

When the main switch SW1 is opened, the voltage supplied from the constant voltage means 6 to the CPU 8 becomes zero. The CPU 8 remains functional due to a backup power supplied by DC voltage V3 supplied by the back up power supply 7. The CPU 8 detects that the voltage V2 at its power terminal is less than a predetermined normal voltage. In response, the CPU 8 outputs a control signal S3 to set the voltage detection means 9 in an operating state.

DC voltage V3 is supplied from the back up power supply 7 to a terminal of the horn switch SW2 via the resistor R1 and the diode D1. By this arrangement, a "switch-on" operating signal S1 will be received by the voltage detection means 9 whenever the horn switch SW2 is closed.

The diode D1 prevents a current flow from DC voltage V1 into back up power supply 7 and the CPU 8 when the main switch S1 is closed. The resistor R1 prevents any excessive current flow from the back up power supply 7 due to a closing of the horn switch SW2.

It should be noted that other switches on the vehicle, besides the horn switch SW2, may be used to generate the "switch-on" operating signal S1. In fact any switch, besides the ignition, or main switch SW1, could be connected to the back up power supply 7 via the resistor R1 and diode D1, and serve equally well.

When the voltage detection means 9 detects the "switch-on" operating signal S1, in other words voltage V3, it means that the horn switch SW2 has been closed. At this point, the voltage detection means 9 outputs a timer activation signal S2 which is received by the CPU 8.

Upon receiving the timer activation signal S2, the CPU 8 starts a timer operation. The CPU 8 outputs a switch control signal S6 to the first switching means 10. The first switching means 10 is closed for a predetermined period of time, until the timer operation is completed. Again, the predetermined period of time is preferably about 60 seconds.

The closing of the first switching means 10 results in a supply of the DC voltage V1 from the vehicle's battery 5 to the receiver 4a. Therefore, the receiver 4a is activated and able to receive transmissions from the transmitter 4b.

After the predetermined period of time has elapsed, the CPU 8 outputs a switch control signal S6 to open the first switching means 10. Therefore, the receiver 4a is deactivated and can no longer receive transmissions from the transmitter 4b.

Should the receiver 4a receive an operating signal S4, transmitted from the transmitter 4b, while activated, the receiver 4a would output an operating signal S5 to the CPU 8.

If the operating signal S5 is a command signal instructing the CPU 8 to activate the warning means 3, the CPU 8 outputs a switch control signal S7. Switch control signal S7 closes the second switching means 11. By closing second switching means 11, DC voltage V1 from the vehicle's battery 5 is supplied to the warning section 3b. Therefore, warning section 3b becomes operational.

If the operating signal S5 is a command signal instructing the CPU 8 to deactivate the warning means 3, the CPU 8 outputs a switch control signal S7. Now, switch control signal S7 opens the second switching means 11. By opening the second switching means 11, DC voltage V1 from the vehicle's battery 5 is cutoff from the warning section 3b. Therefore, warning section 3b becomes inactive.

The vehicle theft prevention device, described above, has several advantages over the prior art devices.

First, power is supplied to the receiver for the remote control for only a predetermined period of time after the main switch has been turned off, thereby, enabling the operator of the vehicle to remotely activate the theft prevention device if desired. Regardless of whether the theft prevention device was activated, the power supply to the receiver is terminated after the lapse of the predetermined period of time. As a result, the load imposed on a vehicle's battery is reduced.

Second, if the theft prevention device was activated and the operator now wishes to deactivate the device, an additional security measure is provided. The receiver will not respond to the transmitter of the remote control until a "switch-on" signal is generated. The "switch-on" signal is generated by the operator manually activating one of the electrical switches of the vehicle, such as the horn switch. Therefore, a thief having a remote control capable of generating an acceptable, but fraudulent, signal cannot disable the vehicle's theft prevention device by simply transmitting that signal. The receiver will only accept signals for a predetermined period of time after an electrical switch on the vehicle has been manually activated.

Figure 2:
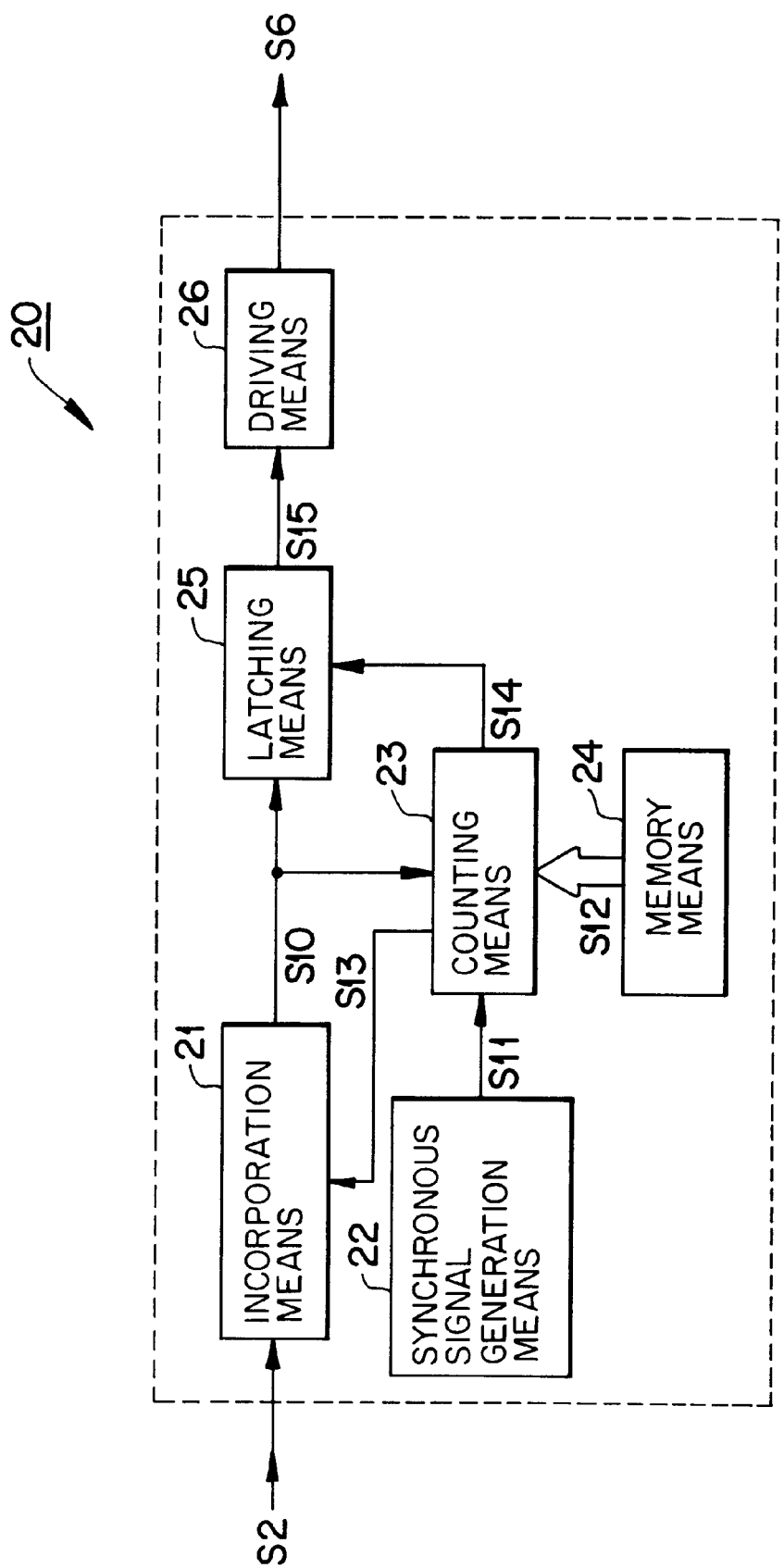
FIG. 2 is a block diagram showing elements of a timer means of the vehicle theft prevention device.

FIG. 2 is a block diagram showing the major elements of the timer means of the vehicle theft prevention device. The timer means 20 is exemplified by a timer function of the CPU 8 (a single-chip micro computer) shown in FIG. 1.

In the FIG. 2, timer means 20 comprises incorporation means 21, synchronous signal generation means 22, counting means 23, memory means 24, latching means 25, and driving means 26.

The synchronous signal generation means 22 includes an oscillator which oscillates at an oscillation frequency generally determined by an external component (such as a quartz oscillator) of the CPU 8. The oscillator outputs a clock signal S11 to the counting means 23.

The incorporation means 21 incorporates a timer activation signal S2 from the voltage detection means 9 shown in FIG. 1. The incorporation means also outputs an incorporation signal S10 to the counting means 23 and the latching means 25. The incorporation signal S10 resets the count value of the counting means 23 to zero to thereby enable counting.

When the counting means 23 is reset, it starts counting clock signals S11 from the synchronous signal generation means 22. When the count value equals 1, the counting means 23 outputs a reset signal S13 to the incorporation means 21 to thereby reset it to be in a waiting state for a timer activation signal S2 to be inputted.

The counting means 23 counts clock signals S11 from the synchronous signal generation means 22 until the count value of the counting means 23 equals a set value. The set value is set by a timer setting signal S12 from the memory means 24. When the count value becomes equal to the set value, the counting means 23 outputs a timer signal S14 to the latching means 25.

The latching means 25 latches an incorporation signal S10 from the incorporation means 21, and outputs a latching signal S15 into the driving means 26. A latching signal S15 is reset by a timer signal S13 from the counting means 23.

The driving means 26 outputs a switch control signal S6. The switch control signal S6 is received by the first switching means 10. Based on a latching signal S15, the first switching means 10 is controlled to be in an open or closed state.

In the timer means described above, operating current is not constantly flowing into the receiver. As a result, the load imposed on a vehicle's battery is reduced.

Figure 3:
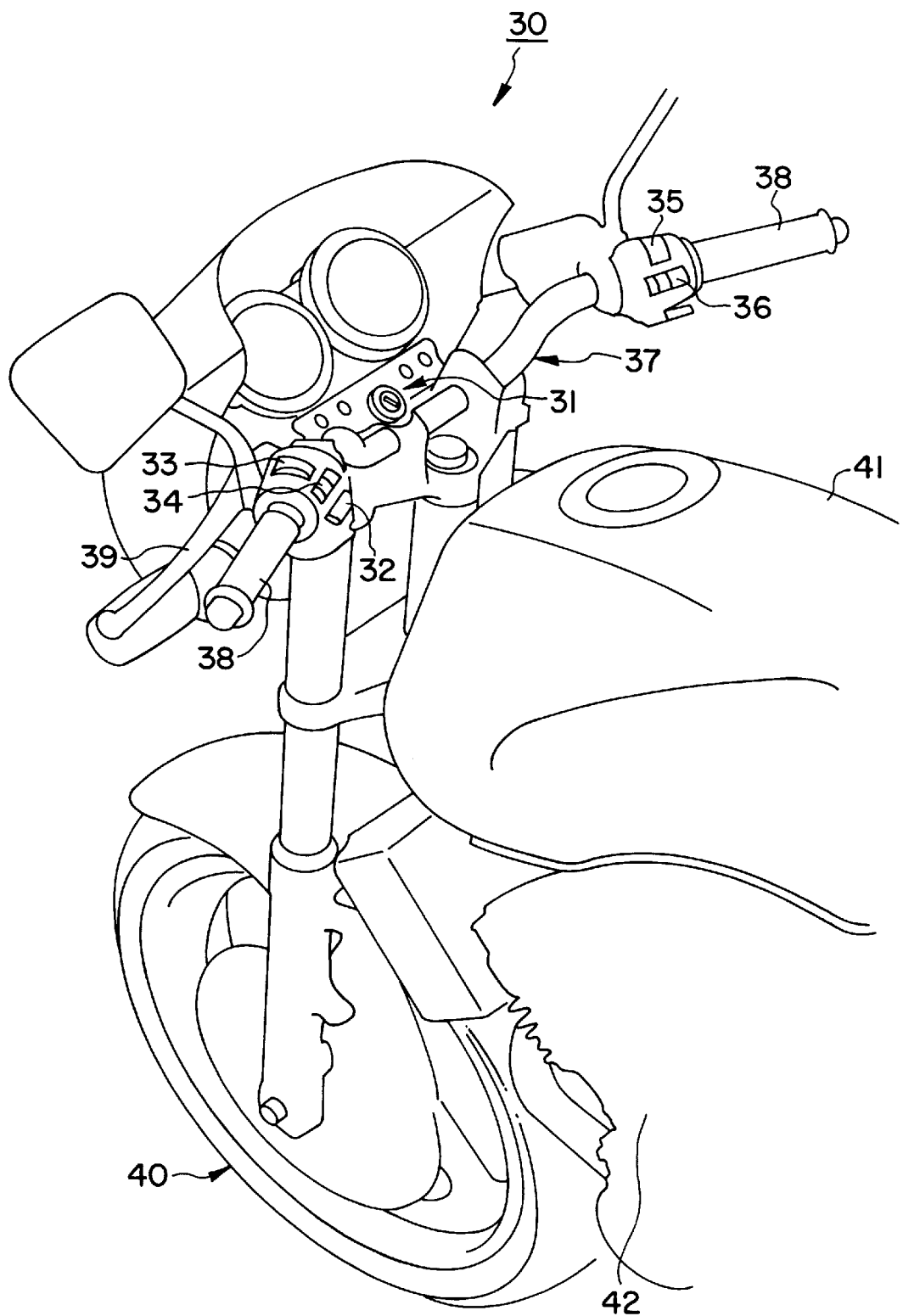
FIG. 3 is an oblique view of a motorcycle showing positions of switches for operating electric equipment of the motorcycle.

FIG. 3 shows a motorcycle 30 having a handlebar 37, a grip 38, a clutch lever 39, a front tire with a wheel 40, a fuel tank 41, and an engine 42. FIG. 3 also shows the electrical equipment operating switches of the motorcycle 30. These electrical equipment operating switches, include a main switch 31, a horn switch 32, a head lamp switch 33, a turn signal switch 34, a kill switch 35, and a starter switch 36.

The vehicle theft prevention device of FIG. 1 uses the horn switch SW2 as the electrical equipment operating switch to cause the receiver for the remote control to operate for a predetermined period of time. However, it should be readily apparent that other electrical switches such as the head lamp switch 33, the turn signal switch 34, the kill switch 35, or the starter switch 36 may be used instead.

Figure 4:
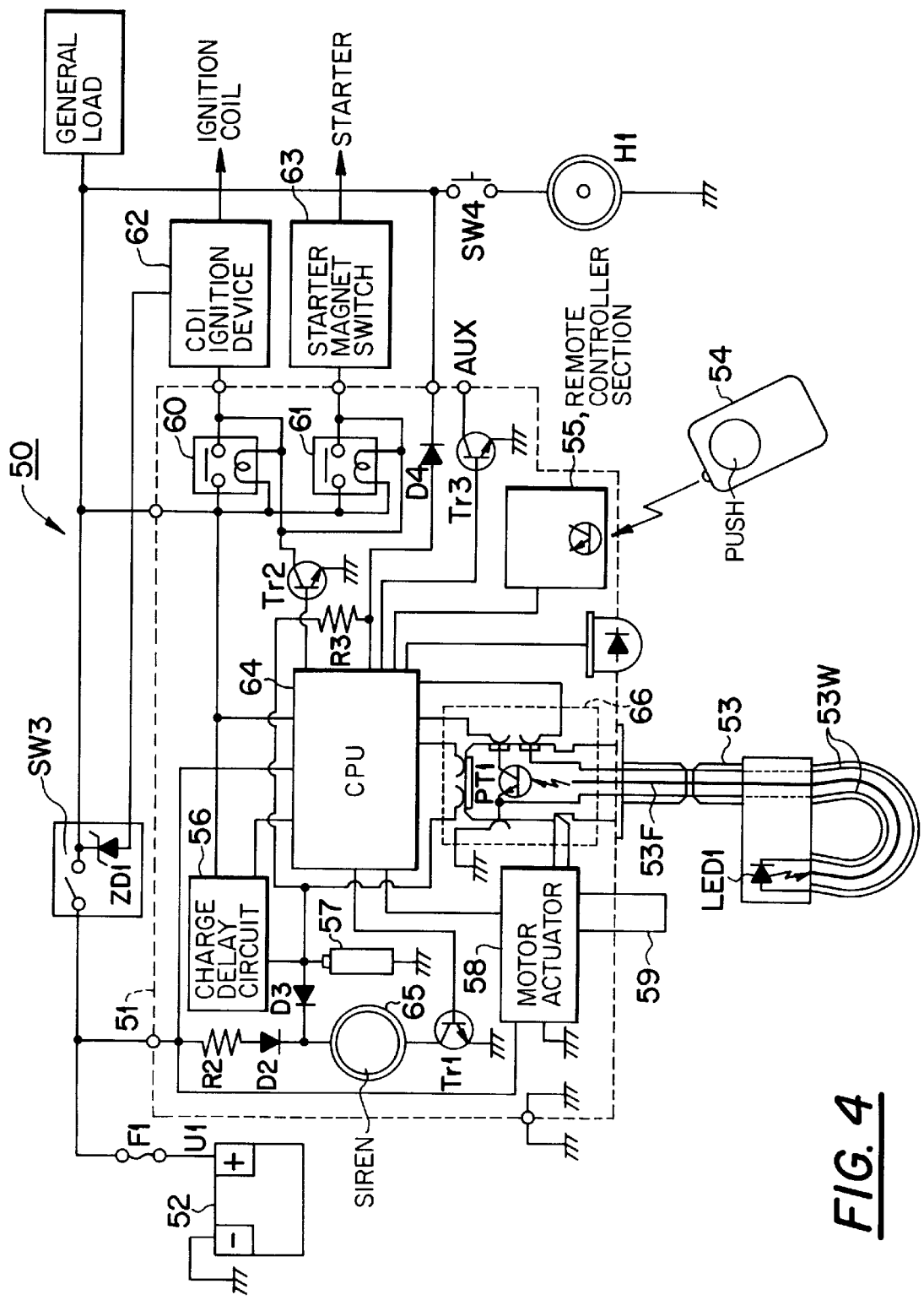
FIG. 4 is a block diagram showing elements of the vehicle theft prevention device including a locking cable.

FIG. 4 shows a vehicle theft prevention device 50 equipped with a locking cable 53. The vehicle theft prevention device 50 includes the locking cable 53, a connection means 66, a charge delay circuit 56, a back up power supply 57, a motor actuator 58, a release button 59, a CPU 64, a switching means 60, a switching means 61, a CDI ignition device 62, a starter magnet switch 63, a remote control controlling section 55, a resistor R2, a resistor R3, a diode D2, a diode D3, a diode D4, a transistor Tr1, a transistor Tr2, and a transistor Tr3.

The locking cable 53 comprises an emitting diode LED1, an optical fiber cable 53F, an electric line 53W, and a photo transistor PT1.

Also, the vehicle theft prevention device 50 further includes, as peripheral devices, a remote control (transmitter) 54, a vehicle's battery 52, a main switch SW3, and a horn switch SW4.

When the main switch SW3 is opened, the CPU 64 causes the transistor Tr2 to be in a cut-off state to thereby turn off the switching means 60 and 61. As a result, a power supply line connecting the vehicle's battery 52, the ignition device 32, and the starter magnet switch 63 via main switch SW3 is electrically disconnected to thereby prohibit engine ignition and motor activation.

The CPU 64 is provided with a timer function, and may prohibit engine ignition and motor activation by causing the transistor Tr2 to be in a cut-off state after about ten seconds have elapsed, following the opening of the main switch SW3.

When the locking cable 53 is located in the connection means 66 of the vehicle theft prevention device 50, the connection means 66 applies a bias to the photo transistor PT1 of the locking cable 53. The connection means 66 also supplies a forward current to the light emitting diode LED1 via the electric line 53W to cause light emission. The emitted light is received by the photo transistor PT1 via the optical fiber cable 53F.

When the locking cable 53 is first located in the connecting means 66, the CPU 64 detects the locking cable 53, and causes the restraint of a release button 59 so as to control the motor actuator 58. This results in the locking cable 53 being retained in the connection means 66.

Disconnection of the locking cable 53 results in disconnection of the electric line 53W and the optical fiber cable 53F. Accordingly, no light is inputted to the photo transistor PT1, causing the photo transistor PT1 to be in a cut-off state. Detecting this situation, the CPU 64 drives the transistor Tr1 to turn it on so that an electric current is transmitted to the siren 35 from the vehicle's battery 52. The electric current is transmitted via the resistor R2 and the diode D2. As a result, an alarm sound is generated.

Note that once the locking cable 53 has been disconnected, the alarm sound by siren 35 will not be stopped even if the locking cable 53 is re-connected.

For more reliable detection of the disconnection of the locking cable 53, an electric current flowing into the LED1 is modulated. Thereby, the light emitted by the LED1 is modulated. With this arrangement, it makes it difficult to deceptively defeat the device using a bypass circuit while disconnecting the locking cable 53.

If the main switch SW3 is closed while the theft prevention device is activated, the CPU 64 drives the transistor Tr1 to turn it on. With transistor Tr1 on, an electric current flows from the vehicle's battery 52 to the siren 65 via the resistor R2 and the diode D2 and the alarm is sounded. When the main switch SW3 is opened, the CPU 64 cuts off the transistor Tr1 to thereby stop the alarm sound.

After operating a predetermined switch of the vehicle (the horn switch SW4 in this embodiment), the remote control controlling section (receiver) 25 operates for a predetermined period of time. The predetermined period of time is due to a timer operation of the CPU 64. During this predetermined period of time, the receiver is capable of receiving a command from the remote control (transmitter) 54.

The vehicle theft prevention device 50 can receive a command from the remote control 54 when the remote control controlling section 55 is in an receivable state. During the receivable state, a command can be received to release the prohibition on engine ignition and motor activation.

If the engine is not activated within a predetermined period of time, engine ignition and motor activation is again prohibited. The predetermined period of time is determined by the timer operation of the CPU 64.

The vehicle theft prevention device 50 receives a command from the remote control 54 when the remote control controlling section 55 is in a receivable state, and the CPU 64 controls the motor actuator 58 based on the command received so as to release the restraint on the release button 59. By pressing the release button 59, the locking cable 53 can be unlocked from the connection means 66.

If the locking cable 53 is not unlocked from the connection means 66 within a predetermined period of time, monitored by the timer operation of the CPU 64, after the motor actuator 58 has released the restraint on the release button 59, the release button 59 is again restrained.

In the vehicle theft prevention device described above, the constant flow of an operating current into the remote control controlling section 55 is prevented. This results in a reduced load being imposed on a vehicle's battery. Further, the theft prevention capability of the device is enhanced relative to the prior art devices.

Figure 5:
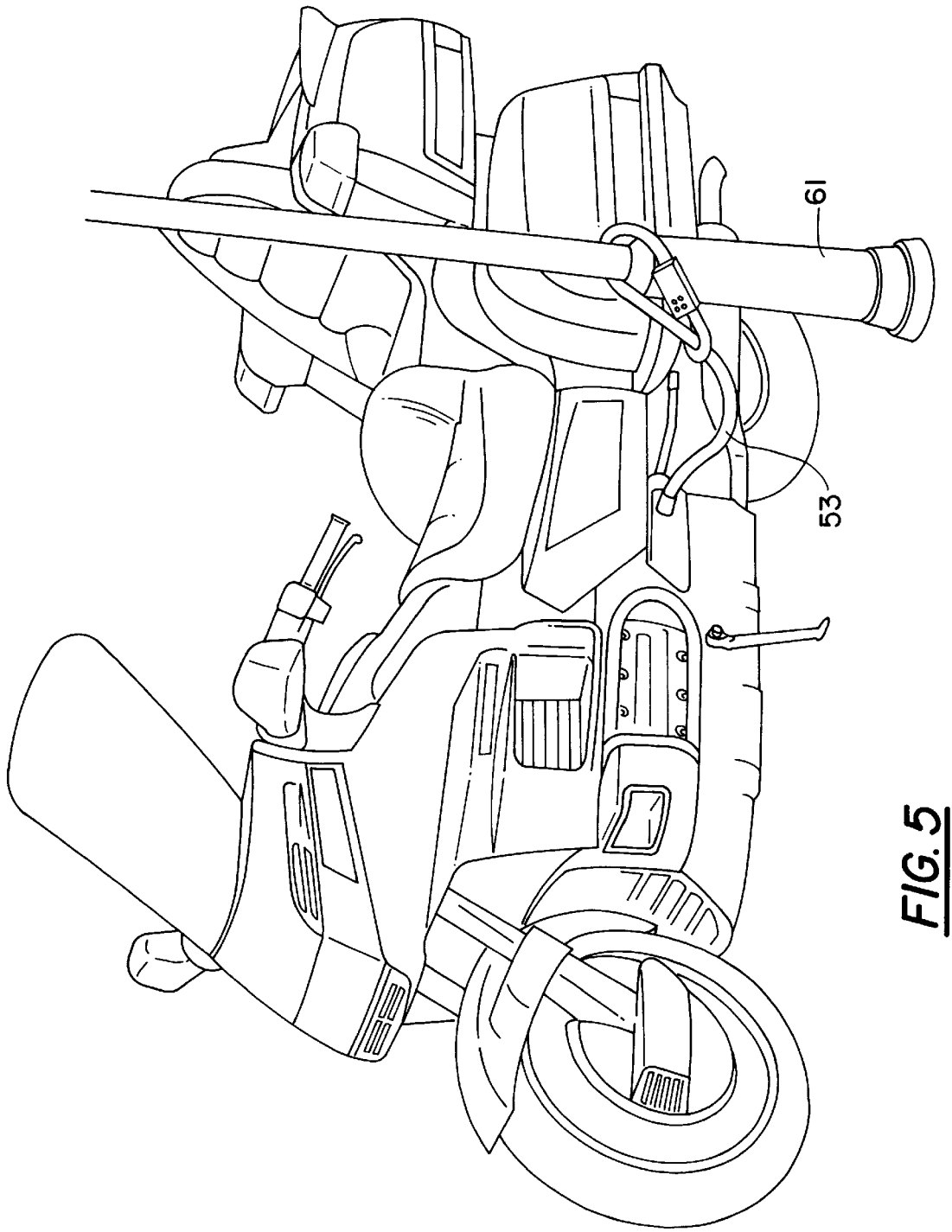
FIG. 5 is an oblique view of a motorcycle secured by the locking cable.

FIG. 5 shows a motorcycle secured to a pillar 61 using the locking cable 53.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A theft prevention device for preventing theft of a vehicle, the theft prevention device comprising:

a theft prevention unit for sensing a disturbance of a vehicle, said theft prevention unit including an indicating device for reporting a sensed disturbance, said theft prevention unit sensing disturbances while in an activated state and not sensing disturbances while in a deactivated stated;

a remote control having a transmitter for transmitting transmission signals including a deactivation signal;

a receiver, for mounting to the vehicle, operating to receive the deactivation signal in order to place said theft prevention unit in said deactivated state; and an operating controller, for mounting to the vehicle, for normally placing said receiver in a disabled state, wherein said receiver does not respond to said transmission signals from said transmitter, said operating controller placing said receiver in an enabled state for a predetermined period of time after a predetermined operation of the vehicle has occurred, wherein said receiver responds to said transmission signals from said transmitter, said operating controller returning said receiver to said disabled state after said predetermined period of time has expired.

2. The theft prevention device according to claim 1, wherein said transmission signals also include an activation signal, and said receiver is also capable of receiving the activation signal in order to place said theft prevention unit in said activated state, when said receiver is in said enabled state.

3. The theft prevention device according to claim 2, wherein said predetermined operation is the opening of the ignition switch of the vehicle.

4. The theft prevention device according to claim 1, wherein the predetermined operation is the closing or opening of an electrical switch of the vehicle.

5. The theft prevention device according to claim 4, wherein said electrical switch of the vehicle is a horn switch.

6. The theft prevention device according to claim 1, wherein said predetermined period of time is approximately 60 seconds.

7. The theft prevention device according to claim 1, wherein said operating controller places said receiver in said disabled state by removing power to said receiver.

8. The theft prevention device according to claim 2, wherein said operating controller places said receiver in said disabled state by removing power to said receiver.

9. The theft prevention device according to claim 3, wherein said operating controller places said receiver in said disabled state by removing power to said receiver.

10. The theft prevention device according to claim 4, wherein said operating controller places said receiver in said disabled state by removing power to said receiver.

11. The theft prevention device according to claim 5, wherein said operating controller places said receiver in said disabled state by removing power to said receiver.

12. The theft prevention device according to claim 6, wherein said operating controller places said receiver in said disabled state by removing power to said receiver.

13. A theft prevention device for detecting a disturbance of a vehicle, said theft prevention device comprising:

- at least one sensor for detecting a disturbance of the vehicle and for generating a disturbance signal;
- a theft prevention unit, for mounting to the vehicle, for receiving the disturbance signal, said theft prevention unit having an activated state and a deactivated state, said theft prevention unit generating a warning signal when said theft prevention unit receives the disturbance signal and is in said activated state, and said theft prevention unit not generating a warning signal when said theft prevention unit is in said deactivated state;
- a detector for detecting a predetermined operation of the vehicle;
- a remote control having a transmitter for transmitting transmission signals including a deactivation signal; and
- a receiver, for mounting to the vehicle, operating to receive the deactivation signal in order to place said theft prevention unit in said deactivated state, wherein said theft prevention unit normally places said receiver in a disabled state, wherein said receiver does not respond to said transmission signals from said transmitter, and said theft prevention unit places said receiver in an enabled state for a predetermined period of time after the predetermined operation has been detected by said detector, wherein said receiver responds to said transmission signals from said transmitter, said theft prevention unit returning said receiver to said disabled state after said predetermined period of time has expired.

14. The theft prevention device according to claim 13, wherein said theft prevention unit places said receiver in said disabled state by removing power to said receiver.

15. The theft prevention device according to claim 14, wherein said transmission signals also include an activation signal, and said receiver is also capable of receiving the activation signal in order to place said theft prevention unit in said activated state, when said receiver is in said enabled state.

16. The theft prevention device according to claim 15, wherein said predetermined operation is the opening of the ignition switch of the vehicle.

17. The theft prevention device according to claim 14, wherein said predetermined operation is the closing or opening of an electrical switch of the vehicle.

18. The theft prevention device according to claim 17, wherein said electrical switch of the vehicle is a horn switch.

19. The theft prevention device according to claim 17, wherein said electrical switch of the vehicle is a turn signal switch.

20. A motorcycle having a theft prevention device for detecting a disturbance of the motorcycle, said theft prevention device comprising:

- at least one sensor for detecting a disturbance of said motorcycle and for generating a disturbance signal;
- a theft prevention unit, mounted to said motorcycle, for receiving the disturbance signal, said theft prevention unit having an activated state and a deactivated state, said theft prevention unit generating a warning signal when said theft prevention unit receives the disturbance signal and is in said activated state, and said theft prevention unit not generating a warning signal when said theft prevention unit is in said deactivated state;
- a detector for detecting a predetermined operation of said motorcycle;
- a remote control having a transmitter for transmitting transmission signals including a deactivation signal; and
- a receiver, mounted to said motorcycle, for receiving the deactivation signal in order to place said theft prevention unit in said deactivated state; wherein said theft prevention unit normally places said receiver in a disabled state, wherein said receiver does not respond to said transmission signals from said transmitter, and wherein said theft prevention unit places said receiver in an enabled state for a predetermined period of time after the predetermined operation has been detected by said detector, wherein said receiver responds to said transmission signals from said transmitter, said theft prevention unit returning said receiver to said disabled state after said predetermined period of time has expired.

* * * * *